(12) United States Patent
Nagai

(10) Patent No.: US 9,176,771 B2
(45) Date of Patent: Nov. 3, 2015

(54) PRIORITY SCHEDULING OF THREADS FOR APPLICATIONS SHARING PERIPHERAL DEVICES

(71) Applicant: CLARION CO., LTD., Tokyo (JP)

(72) Inventor: Yasushi Nagai, Tokyo (JP)

(73) Assignee: CLARION CO., LTD., Tokyo (JP)

( * ) Notice: Subject to any disclaimer, the term of this patent is extended or adjusted under 35 U.S.C. 154(b) by 458 days.

(21) Appl. No.: 13/781,578

(22) Filed: Feb. 28, 2013

(65) Prior Publication Data

US 2013/0174173 A1 Jul. 4, 2013

Related U.S. Application Data

(63) Continuation of application No. 12/826,093, filed on Jun. 29, 2010, now abandoned.

(30) Foreign Application Priority Data

Aug. 11, 2009 (JP) ................................. 2009-186562

(51) Int. Cl.
*G06F 9/46* (2006.01)
*G06F 9/48* (2006.01)
*G06F 9/52* (2006.01)

(52) U.S. Cl.
CPC ............ *G06F 9/4843* (2013.01); *G06F 9/4881* (2013.01); *G06F 9/52* (2013.01)

(58) Field of Classification Search
None
See application file for complete search history.

(56) References Cited

U.S. PATENT DOCUMENTS

| 6,477,562 | B2 | 11/2002 | Nemirovsky et al. |
| 6,952,214 | B2 | 10/2005 | Naegle et al. |
| 7,039,770 | B1 | 5/2006 | Chen et al. |
| 7,111,156 | B1 | 9/2006 | Mang et al. |
| 7,287,255 | B2 | 10/2007 | Potter, Jr. |
| 7,634,776 | B2 | 12/2009 | Parameswaran et al. |
| 7,797,691 | B2 | 9/2010 | Cockx et al. |
| 7,802,256 | B2 | 9/2010 | Havens |
| 7,827,554 | B2 | 11/2010 | Grigorovitch et al. |
| 2001/0027464 | A1* | 10/2001 | Tavoletti et al. ............... 709/103 |
| 2002/0062435 | A1 | 5/2002 | Nemirovsky et al. |
| 2004/0139441 | A1 | 7/2004 | Kaburaki et al. |
| 2004/0216112 | A1 | 10/2004 | Accapadi et al. |
| 2005/0060710 | A1* | 3/2005 | Kush ............................. 718/103 |

(Continued)

FOREIGN PATENT DOCUMENTS

| JP | 05250188 A | 9/1993 |
| JP | 11272627 A | 10/1999 |

(Continued)

*Primary Examiner* — Meng An
*Assistant Examiner* — James J Lee
(74) *Attorney, Agent, or Firm* — Volpe and Koenig, P.C.

(57) ABSTRACT

A data processing method has a device control thread for each peripheral device capable of an independent operation, a CPU processing thread for each data processing that is performed by a CPU, a control thread equipped with a processing part for constructing an application. The control thread checks an output from the thread related with each processing part, performs with a higher priority from the processing part in which output data of the preprocessing part as a configuration of the application exists and that is near termination, and instructs execution of the each device control thread and the CPU processing thread, and data input/output. Each of device control thread and CPU processing thread processes the data according to the instructions, and sends a processing result and a notification to the control thread.

4 Claims, 3 Drawing Sheets

| | APPLICATION ID | APPLICATION PRIORITY | PROCESSING PART ID | PROCESSING PART RELATED THREAD ID | PREPROCESSING PART ID | PREPROCESSING PART OUTPUT BUFFER FLAG |
|---|---|---|---|---|---|---|
| 201 | MAP UPDATING APPLICATION | 2 | 143 | 112 | – | – |
| | | | 144 | 113 | 143 | NON-EXISTENCE |
| | | | 145 | 114 | 144 | NON-EXISTENCE |
| | | | 146 | 115 | 145 | NON-EXISTENCE |
| 202 | ROUTE GUIDANCE APPLICATION | 1 | 147 | 115 | – | – |
| | | | 148 | 116 | 147 | NON-EXISTENCE |
| | | | 149 | 117 | 148 | NON-EXISTENCE |
| 203 | | 1 | 143 | 112 | – | – |
| | | | 147 | 115 | – | NON-EXISTENCE |
| | | | 144 | 113 | 143 | NON-EXISTENCE |
| | | | | | 147 | NON-EXISTENCE |
| | | | 146 | 115 | 144 | NON-EXISTENCE |
| | ... | | ... | ... | ... | ... |

151 INSTRUCTION ID

118

(56) References Cited

U.S. PATENT DOCUMENTS

| | | |
|---|---|---|
| 2005/0080824 A1 | 4/2005 | Vaidyanathan et al. |
| 2005/0262510 A1 | 11/2005 | Parameswaran et al. |
| 2006/0161582 A1 | 7/2006 | Aghajanyan |
| 2006/0179196 A1* | 8/2006 | Gray .............................. 710/240 |
| 2006/0288350 A1 | 12/2006 | Grigorovitch et al. |
| 2006/0294522 A1 | 12/2006 | Havens |
| 2007/0162910 A1 | 7/2007 | Shimomura |
| 2007/0198971 A1 | 8/2007 | Dasu et al. |
| 2007/0204137 A1 | 8/2007 | Tran |
| 2008/0114937 A1 | 5/2008 | Reid et al. |
| 2008/0250422 A1 | 10/2008 | Lewis |
| 2009/0070552 A1 | 3/2009 | Kanstein et al. |
| 2009/0100432 A1 | 4/2009 | Holloway et al. |
| 2009/0138670 A1 | 5/2009 | Mutlu et al. |
| 2009/0138683 A1 | 5/2009 | Capps et al. |
| 2009/0165006 A1 | 6/2009 | Ceze et al. |
| 2009/0165007 A1 | 6/2009 | Aghajanyan |
| 2009/0172686 A1* | 7/2009 | Chen et al. ..................... 718/103 |
| 2009/0320021 A1* | 12/2009 | Pan et al. ...................... 718/100 |
| 2010/0031006 A1 | 2/2010 | El-Essawy et al. |
| 2011/0087860 A1 | 4/2011 | Nickolls et al. |
| 2011/0093854 A1 | 4/2011 | Blanc et al. |
| 2011/0265068 A1 | 10/2011 | Elnozahy et al. |

FOREIGN PATENT DOCUMENTS

| | | |
|---|---|---|
| JP | 2004-163963 A | 6/2004 |
| JP | 2004-334537 A | 11/2004 |
| WO | WO01/35209 | 5/2001 |

* cited by examiner

| | APPLICATION ID | PROCESSING PART ID | PROCESSING PART RELATED THREAD ID | PREPROCESSING PART ID | PREPROCESSING PART OUTPUT BUFFER FLAG |
|---|---|---|---|---|---|
| 201 | MAP UPDATING APPLICATION | 143 | 112 | – | – |
| | | 144 | 113 | 143 | NON-EXISTENCE |
| | | 145 | 114 | 144 | NON-EXISTENCE |
| | | 146 | 115 | 145 | NON-EXISTENCE |
| 202 | ROUTE GUIDANCE APPLICATION | 147 | 115 | – | – |
| | | 148 | 116 | 147 | NON-EXISTENCE |
| | | 149 | 117 | 148 | NON-EXISTENCE |
| 203 | | 143 | 112 | – | – |
| | | 147 | 115 | – | NON-EXISTENCE |
| | | 144 | 113 | 143 | NON-EXISTENCE |
| | | | | 147 | NON-EXISTENCE |
| | | 146 | 115 | 144 | NON-EXISTENCE |
| | ... | ... | ... | ... | ... |

151 INSTRUCTION ID → 118

FIG. 4

| APPLICATION ID | APPLICATION PRIORITY | PROCESSING PART ID | PROCESSING PART RELATED THREAD ID | PREPROCESSING PART ID | PREPROCESSING PART OUTPUT BUFFER FLAG |
|---|---|---|---|---|---|
| MAP UPDATING APPLICATION | 2 | 143 | 112 | – | – |
| | | 144 | 113 | 143 | NON-EXISTENCE |
| | | 145 | 114 | 144 | NON-EXISTENCE |
| | | 146 | 115 | 145 | NON-EXISTENCE |
| ROUTE GUIDANCE APPLICATION | 1 | 147 | 115 | – | – |
| | | 148 | 116 | 147 | NON-EXISTENCE |
| | | 149 | 117 | 148 | NON-EXISTENCE |
| | 1 | 143 | 112 | – | – |
| | | 147 | 115 | 143 | NON-EXISTENCE |
| | | 144 | 113 | 147 | NON-EXISTENCE |
| | | 146 | 115 | 144 | NON-EXISTENCE |
| ... | | ... | ... | ... | ... |

118

151 INSTRUCTION ID 201
202
203

PRIORITY SCHEDULING OF THREADS FOR APPLICATIONS SHARING PERIPHERAL DEVICES

CROSS REFERENCE TO RELATED APPLICATIONS

This application is a continuation of U.S. patent application Ser. No. 12/826,093, filed Jun. 29, 2010, which is incorporated by reference as if fully set forth.

CLAIM OF PRIORITY

The present invention claims priority from Japanese patent application JP2009-186562 filed on Aug. 11, 2009, the content of which is hereby incorporated by reference into this application.

BACKGROUND OF THE INVENTION

The present invention relates to a data processor and a data processing method, and more specifically to data processing with a plurality of devices.

Regarding data dealt with a car navigation system, not only maps but also multimedia data (moving images, music, sounds, etc.) has come to be used in recent years. Accordingly, along with main route guide, application programs such as a function of converting a moving image of TV broadcasting, etc. with a codec for moving images in real time and recording it in a hard disk, a function of displaying moving image content data recorded as digital data on an optical disk of DVD, etc. on a display device, and a function of recording music data recorded in a CD or in a portable music player in a hard disk operate simultaneously. Moreover, in order to realize these functions, a CPU of the car navigation system is connected with various high-function peripheral devices such as a TV tuner, a codec circuit for moving images, a hard disk IF circuit, an optical disk IF circuit of DVD, etc., a display device IF circuit, and a portable music player IF circuit.

Since a single application program uses a plurality of peripheral devices in this way, there is a problem that their controls become complex and a response speed and a throughput become worse. Moreover, there is a problem that a plurality of application programs cannot share peripheral devices and fast response speeds and high throughputs of the respective application programs cannot be realized.

On the other hand, Japanese patent application JP-Hei 11-272627 discloses a technology of increasing the throughput by connecting the devices according to FIFO and making the devices process data in a pipe-line manner from a dependent relation of the data processed by the respective devices.

Moreover, Japanese patent application JP-Hei 5-250188 discloses a technology of simultaneously executing the plurality of application programs by deciding priorities of the application programs and performing a priority control. For example, a thread of a priority of level 1 is executed ahead of threads with level 2 and level 3.

Moreover, in the case of an installed OS, there is provided a contrivance that, when a thread of level 3 executed by the thread of level 1 starts to be processed upon a request of level 1, the priority of level 1 can be succeeded.

SUMMARY OF THE INVENTION

With a technology of Japanese patent application JP-Hei 11-272627, in the case where the use of each device is being fixed, there is a problem that a use sequence of devices by switching an application cannot be changed.

In addition, it is impossible to simultaneously perform applications each having a different use sequence of the devices.

Moreover, the technology described in Japanese patent application JP-Hei 5-250188 comes with problems such as a phenomenon (priority inversion) of a thread of a high priority turning out to be made to wait by a thread of a low priority. For example, consider a case where a thread of a priority of level 1 needs to use a processing result of a thread of a priority of level 3, and its processing is made to start while keeping a thread of a priority of level 2 waiting. Since the thread of level 3 has a lower priority than that of the thread of level 2, the thread of level 3 will be started after waiting for processing of the thread of level 2 that is waiting to be executed. As a result, the thread of level 1 will be kept waiting by a processing of level 2 that is lower than itself in priority.

Moreover, in the case of the installed OS, there is provided a contrivance whereby, when the thread of level 3 that is executed by the thread of level 1 starts to process upon a request of level 1, that thread can inherit the priority of level 1. Thereby, it is made not to happen for the thread of level 1 to be waited by the thread of level 2. However, there is still a problem in any application that uses input/output devices. In the case where two threads are configured to control respective devices of the input/output, the priority of the thread for the output device is made high. This is to prevent a situation where processing on the output side does not proceed, but only processing on the input side proceeds, and therefore memory is heavily consumed, its latency deteriorates, and the throughput decreases. Assume that the priority of a thread for an input device is set to 3 and the priority of the thread for an output device is set to 1. At this time, since the thread for an output device will start to operate by an occasion of an input to the thread for the input device of a low priority, it is impossible to increase the priority of the thread for the input device. For this reason, processing of the application that uses input/output devices will be kept waiting by another application performing with a thread of level 2.

The first problem that is intended to be solved is a point that the use sequence of the devices cannot be switched in realizing the application program whose response speed and throughput are high and that shares the plurality of devices. This problem makes it impossible for applications each of whose use sequences of the devices is different to be performed simultaneously.

The second problem is that a thread of a high priority is made to wait by a thread of a low priority in the priority control.

In order to solve the above-mentioned problem, a disclosed data processor fixes operation instruction timings of peripheral devices from a dependence relationship of processed data and realizes a pipeline processing.

A more concrete mode of the data processor that is disclosed is of the following configuration. The data processor has: device control threads corresponding to respective peripheral devices each capable of an independent operation; CPU processing threads corresponding to respective predetermined data processing that are performed by a CPU; a control thread equipped with a plurality of processing parts for constructing an application using the device control threads and the CPU processing threads; and an application management table for defining the application by a combination of the plurality of processing parts and managing its performance; wherein the control thread checks output data from each thread of the device control threads and the CPU processing threads that are associated with each of the plurality of processing parts, performs with a higher priority from the processing part near termination of the processing of the application defined by the application management table among the plurality of processing parts corresponding to the device control threads and the CPU processing threads in each of which the output data exists, and instructs execution of the device control threads and the CPU processing threads and input/output of the data; each of the device control threads control the corresponding peripheral devices according to the instructions, and in response to the completion notifications of the peripheral devices, sends a processing result of the peripheral devices and the completion notification to the control thread; and each of the CPU processing threads performs a predetermined data processing according to the instruction and sends the processing result of the predetermined data processing and a notification to the control thread.

Another mode of the data processor that is disclosed has: an application management table for defining an application that makes a plurality of peripheral devices operate according to an operation sequence; a device control thread for controlling the peripheral devices correspondingly to the plurality of respective peripheral devices; and a control thread that selects a device control thread such that the operation sequence defined by the application management table is later among device control threads each of which has a higher priority than those of the device control threads and has input data to be processed by the peripheral devices and makes it execute.

Yet another mode of the data processor that is disclosed is such that the device control thread is provided correspondingly to each operation type of the peripheral devices having a plurality of operation types among the plurality of peripheral devices.

According to the data processor and its method according to the present invention, it is possible to execute an application program whose response speed and throughput are high and that shares a plurality of devices.

These and other features, objects and advantages of the present invention will become more apparent from the following description when taken in conjunction with the accompanying drawings.

BRIEF DESCRIPTION OF THE DRAWINGS

FIG. 4 is another configuration example of the application management table of the data processor.

DESCRIPTION OF THE EMBODIMENTS

Hereafter, embodiments will be described using drawings.

First Embodiment

Figure 1:
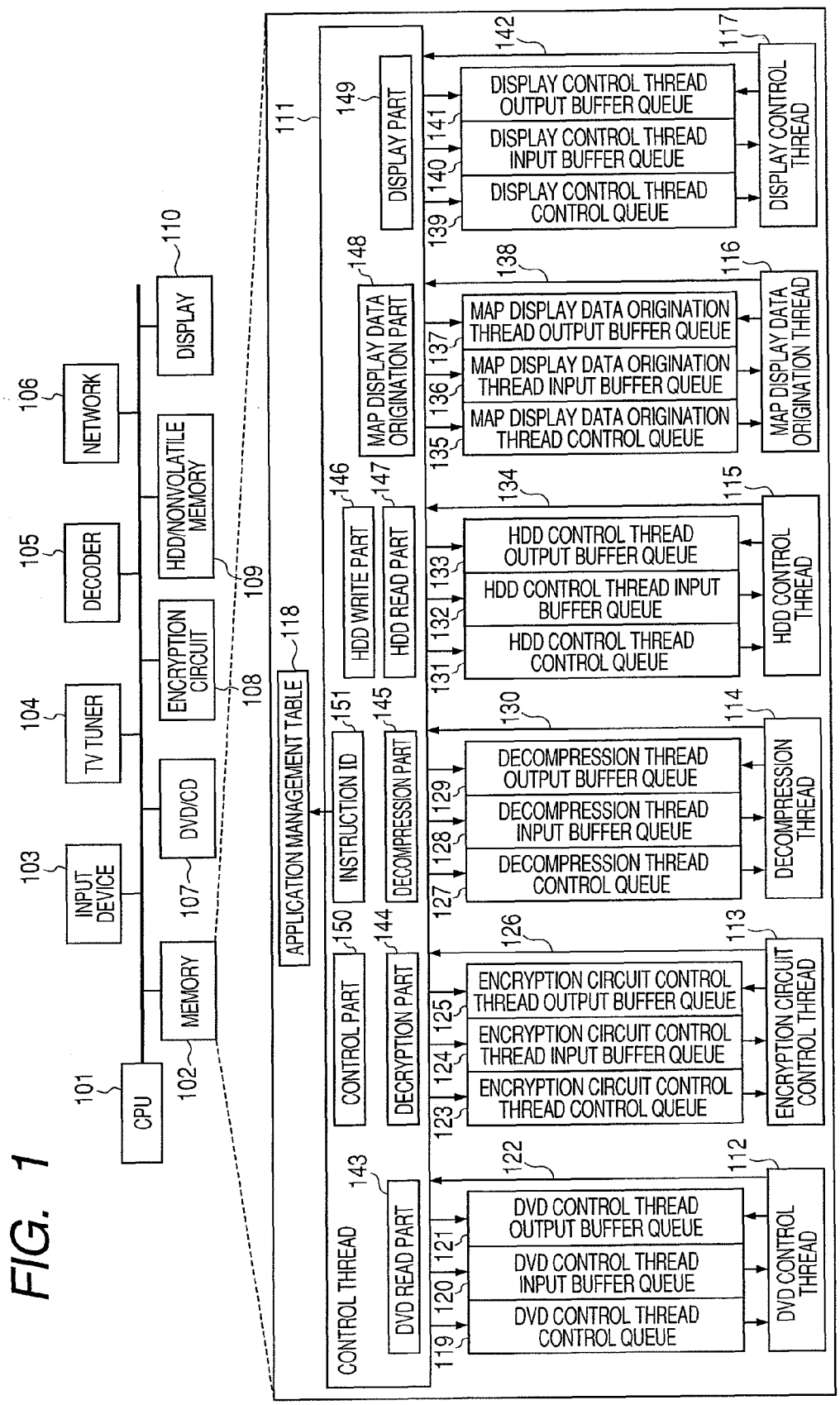
FIG. 1 is a block diagram of a data processor.
Figures 2, 3:
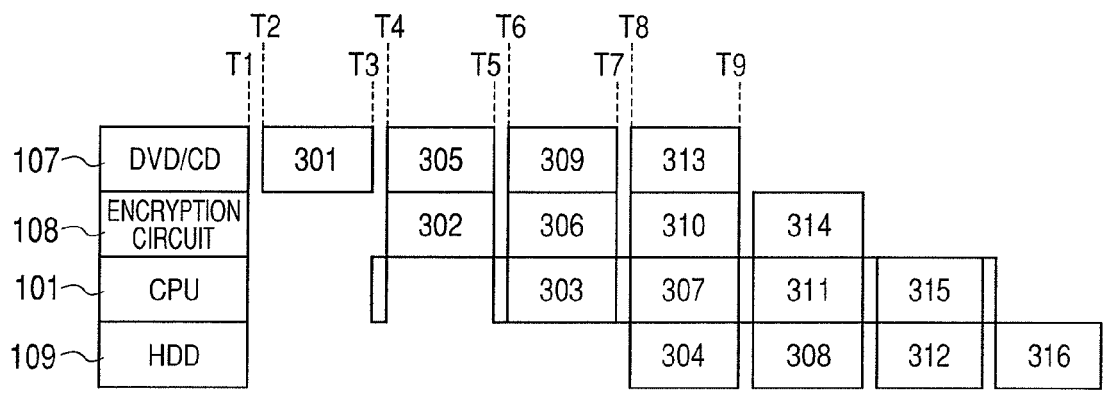
FIG. 2 is a configuration example of an application management table of the data processor.
FIG. 3 is an operation timing chart of a CPU and peripheral devices of the data processor.

FIG. 1 is a block diagram of a data processor of a first embodiment. FIG. 2 is a configuration example of an application management table. FIG. 3 is a timing chart of a CPU and peripheral devices.

In FIG. 1, the data processor is of a configuration where peripheral devices of a CPU 101, a memory 102, input devices 103, a TV tuner 104, a decoder 105, a network interface 106, a DVD/CD 107, an encryption circuit 108, an HDD/ nonvolatile memory 109, and a display 110 are connected by a bus. The CPU 101 performs each processing that will be described later. The memory 102 stores a program that the CPU 101 executes and input/output data of the CPU 101 and the peripheral devices 103 to 110. The input devices 103 as peripheral devices are a switch, a button, a touch panel, a mouse, etc. The decoder 105 decodes contents data of images, music, etc. sent from a TV tuner, a network, a DVD, and an HDD. The network interface 106 is network interface circuits, such as of a cellular phone and CAN. The DVD/CD 107 is a DVD/CD medium in which an updated map, an image, music, a photograph, etc. are stored and a DVD/CD interface circuit. The encryption circuit 108 performs decipherment of encrypted data and encryption of data. The HDD/nonvolatile memory 109 is an interface circuit with a storage such as HDD/nonvolatile memory, and the HDD/nonvolatile memory. The display 110 displays a processing result of this data processor.

The CPU 101 will perform the application by executing a combination of programs (processing parts and threads). Although the processing parts and threads may be called processing parts or threads, two kinds of names are used here in order to make the explanation easy to understand. The processing part will be described later.

The threads include device control threads 112, 113, 115, and 117 each for controlling an operation of the each peripheral device, CPU processing threads 114 and 116 each for performing a predetermined function with the CPU 101, and a control thread 111. The control thread 111 controls parallel executions of the device control threads 112, 113, 115, and 117 and the CPU processing threads 114 and 116 through the processing parts corresponding to the respective threads. That is, each processing part is included in the control thread 111. The device control threads 112, 113, 115, and 117 make the respective peripheral devices operate in parallel under a control by the control thread 111. As described above, in order to realize the control by the control thread 111, the priority of the control thread 111 is set higher than those of the other threads.

The device control threads 112, 113, 115, and 117 and the CPU processing threads 114 and 116 of this embodiment are as follows: the DVD control thread 112 performs control of the DVD/CD 107 and management of input/output data according to instructions of the control thread 111. The encryption circuit control thread 113 performs control of the encryption circuit 108 and management of input/output data according to the instructions of the control thread 111. The decompression thread 114 performs decompression processing of compressed data as processing of the CPU 101 according to the instructions of the control thread 111. The HDD control thread 115 performs control of the HDD/nonvolatile memory 109 and management of input/output data according to the instructions of the control thread 111. The map display data origination thread 116 converts map data into data in a form that can be displayed on the display 110 as processing of the CPU 101. The display control thread 117 performs control of the display 110 and management of input data.

FIG. 2 shows a configuration example of an application management table 118. The application management table 118 defines the application by a configuration and an operation sequence of a combination of the threads of the device control threads 112, 113, 115, and 117 and the CPU processing threads 114 and 116, and the control thread 111 manages parallel operation control of the CPU 101 and the peripheral devices referring to the application management table 118.

The application management table 118 has items of application ID, processing part ID, processing part related thread ID, preprocessing part ID, and a preprocessing part output buffer flag. Incidentally, in FIG. 2, although the name of the application is shown as an application ID, an ID of each processing part and a thread ID related to the each processing part are shown by symbols of each processing part and the each thread shown in FIG. 1 in order to avoid complication of the drawing. In application ID fields, an ID of a map updating application 201 and an ID of a route guidance application 202 are illustrated. Each line of the map updating application 201 and the route guidance application 202 of the application management table 118 shows a configuration of the each application.

The processing part IDs of the line of the map updating application 201 are respective processing parts of a DVD read part 143, a decryption part 144, a decompression part 145, and an HDD write part 146 that construct the map updating application 201. The processing part related thread ID shows the thread used by the each processing part that constitutes the map updating application 201. FIG. 2 shows that the DVD read part 143 uses the DVD control thread 112, the decryption part 144 uses the encryption circuit control thread 113, the decompression part 145 uses the decompression thread 114, and the HDD write part 146 uses the HDD control thread 115, respectively.

The preprocessing part ID expresses a dependence relationship of the processing parts that constitute the application. As the dependence relationship of the processing part of the map updating application 201, it expresses that the execution sequence of the DVD read part 143 is a head of the processing of the map updating application 201, the decryption part 144 uses a processing result of the DVD read part 143, the decompression part 145 uses an output of the decryption part 144, and the HDD write part 146 uses an output of the decompression part 145. This expresses that the application is an application in which the decryption part 144 decrypts data that the DVD read part 143 read from the DVD/CD 107 in the DVD read part 143 through the DVD control thread 112, using the encryption circuit 108 through the encryption circuit control thread 113, the decompression part 145 decompresses the decrypted data using the decompression thread 114, and the HDD write part 146 writes decompressed data in the HDD/nonvolatile memory 109 through the HDD control thread 115. That is, the data is processed in the order of the DVD read part 143, the decryption part 144, the decompression part 145, and the HDD write part 146.

In this embodiment, in order to perform smoothly a series of processing of the plurality of processing parts, the processing part near termination of the processing is operated with a higher priority. For this reason, in performing the map updating application 201, the priorities of the processing parts become higher in the order of the DVD read part 143, the decryption part 144, the decompression part 145, and the HDD write part 146, the priority of the HDD write part 146 being the highest.

The preprocessing part output buffer flag shows Existence/Non-existence of output data of the preprocessing part. That is, the preprocessing part output buffer flag in a line of the encryption circuit control thread 113 of the map updating application 201 shows whether the data that should be processed by the encryption circuit control thread 113 exists, and "Non-existence" of FIG. 2 shows that the data to be processed does not exist. If this flag is "Existence," the encryption circuit control thread 113 is executed according to the priority of the processing part.

Delivery of data among the control thread 111, the device control threads 112, 113, 115, and 117, and the CPU processing threads 114 and 116 will be explained. For delivery of this data, communication through the memory 102 is used.

In a DVD control thread control queue 119, the control thread 111 stores control information to the DVD control thread 112. In a DVD control thread input buffer queue 120, an input buffer that the control thread 111 gives to the DVD control thread 112 is set. The output data of the DVD control thread 112 is stored in a DVD control thread output buffer queue 121. A DVD control thread notification 122 is a signal line (a flag on the memory 102) through which the DVD control thread 112 notifies the control thread 111 of processing completion, etc.

A reference numeral 123 represents an encryption circuit control thread control queue 123 in which the control thread 111 stores control information to the encryption circuit control thread 113. In an encryption circuit control thread input buffer queue 124, a buffer that stores input data given by the control thread 111 to the encryption circuit control thread 113 is set. In an encryption circuit control thread output buffer queue 125, output data of a result obtained by the encryption circuit control thread 113 performing encryption/decryption using the encryption circuit 108 is stored. Encryption circuit control thread notification 126 is a signal line through which the encryption circuit control thread 113 notifies the control thread 111 of processing completion, etc.

In a decompression thread control queue 127, the control thread 111 stores control information to the decompression thread 114. In a decompression thread input buffer queue 128, a buffer in which input data that the control thread 111 gives to the decompression thread 114 and is an object of decompression is stored is set. In a decompression thread output buffer queue 129, output data of a result that the decompression thread 114 decompressed is stored. A decompression thread notification 130 is a signal line through which the decompression thread 114 notifies the control thread 111 of processing completion, etc.

In an HDD control thread control queue 131, the control thread 111 stores control information to the HDD control thread 115. In an HDD control thread input buffer queue 132, a buffer that stores data that the control thread 111 writes in the HDD/nonvolatile memory 109 is set. In an HDD control thread output buffer queue 133, data that the HDD control thread 115 read from the HDD/nonvolatile memory 109 is stored. An HDD control thread notification 134 is a signal line through which the HDD control thread 115 notifies the control thread 111 of processing completion, etc.

In a map display data origination thread control queue 135, the control thread 111 stores control information to the map display data origination thread 116. In a map display data origination thread input buffer queue 136, an input buffer in which the control thread 111 stores the map data in the map display data origination thread 116 is set. In a map display data origination thread output buffer queue 137, data for display that the map display data origination thread 116 made based on the inputted map data is stored. A map display data origination notification 138 is a signal line through which the map display data origination thread 116 notifies the control thread 111 of processing completion, etc.

In a display control thread control queue 139, the control thread 111 stores control information to the display control thread 117. In a display control thread input buffer queue 140, a buffer in which the control thread 111 stores display data that is displayed on the display 110 is set. In a display control thread output buffer queue 141, data that the display control thread 117 sends to the control thread 111 is stored. Display control thread notification 142 is a signal line through which the display control thread 117 notifies the control thread 111 of processing completion, etc.

The processing part that is controlled by a control part 150 that is one of the processing parts in the control thread 111, and controls the device control threads 112, 113, 115, and 117 and the CPU processing threads 114 and 116 will be explained.

The DVD read part 143 reads data of a map, an image, a piece of music, etc. stored in the DVD/CD 107 through the DVD control thread 112. The decryption part 144 controls the encryption circuit 108, and decrypts the encrypted data through the encryption circuit control thread 113. The decompression part 145 decompresses the compressed data by executing the decompression thread 114 with the CPU 101. The HDD write part 146 controls the HDD/nonvolatile memory 109 through the HDD control thread 115, and writes data of an update map, update map related information, an image, a piece of music, an operation record, etc. in the HDD/nonvolatile memory 109. An HDD read part 147 controls the HDD/nonvolatile memory 109 through the HDD control thread 115, and reads data of a map, map related information, the image, the piece of music, the operation record, etc. from the HDD/nonvolatile memory 109. By making the CPU 101 execute the map display data origination thread 116, a map display data origination part 148 converts a map and map related information into a data row that the display control thread 117 can display on the display 110. The display part 149 controls the display 110 and displays inputted display data through the display control thread 117.

The control part 150 controls respective threads related to the processing parts 143 to 149 sequentially according to a configuration of the application defined by the application management table 118. An instruction ID 151 indicates one of the processing parts 143 to 149 that the control part 150 is controlling, which is updated by the control part 150.

An operation of the application will be explained taking the map updating application 201 as an example. FIG. 3 shows operations of the DVD/CD 107, the encryption circuit 108, the CPU 101, and the HDD/nonvolatile memory 109 with a horizontal axis denoting time. First, at time T1 (hereinafter, time Tn is represented simply by Tn) the control thread 111 is executed by the CPU 101. The control part 150 of the control thread 111 checks an output from a thread associated with each processing part. That is, it checks the preprocessing part output buffer flags in lines of the map updating application 201 of the application management table 118. FIG. 2 shows an initial state, and since none of the processing parts has data that can be processed, all the preprocessing part output buffer flags are "Non-existence." Since what the DVD read part 143 does is processing that needs no input data, the preprocessing part output buffer flag is "-(hyphen)," and the DVD read part 143 can perform execution. For this reason, the control part 150 performs the DVD read part 143. The DVD read part 143 gives a read instruction to the DVD control thread control queue 119, gives a buffer in which read result data is stored to the DVD control thread input buffer queue 120, checks that the data has not arrived at the DVD control thread output buffer queue 121, and completes the processing. When receiving the read instruction from the DVD control thread control queue 119, the DVD control thread 112 controls the DVD/CD 107 so that the data may be stored in a buffer designated by the DVD control thread input buffer queue 120, and waits without using the CPU 101 until the processing of the DVD/CD 107 is completed. At T2, the DVD/CD 107 starts reading by control from the DVD read part 143, and completes the reading at T3. A reference numeral 301 shown in FIG. 3 shows a period (from T2 to T3) during which the DVD/CD 107 is operating by the control at T2.

At T3, the DVD control thread 112 returns a preprocessing output buffer flag in a line of the decryption part 144 that is the processing part ID of the application management table 118 to "Non-existence," stores read result data in the DVD control thread output buffer queue 121, and notifies the DVD read part 143 of it via the DVD control thread notification 122. Receiving this notification, the DVD read part 143 changes the preprocessing output buffer flag in a line of the DVD read part 143 that is the preprocessing ID of the map updating application 201 of the application management table 118 to Existence, and transfers the processing to the control part 150.

The control content at T3 has been explained. Next, transition of a control entity, such as the DVD control thread 112, the DVD read part 143 of the control thread, will be explained. At T3, when the DVD/CD 107 completes a predetermined operation, a completion interrupt is generated to the CPU 101 in accompany with operation completion. The interrupt to the CPU 101 is analyzed by an interrupt processing routine of the OS whose explanation is omitted, and predetermined processing is performed. Here, it analyzes that it is an interrupt from the DVD/CD 107, and executes the DVD control thread 112 as the predetermined processing. The DVD control thread notification 122 of the DVD control thread 112 is also an interrupt (software interrupt) to the CPU. The interrupt processing routine of the OS analyzes that it is an interrupt of the DVD control thread notification 122, and executes the control thread 111 as the predetermined processing using a fact of being the DVD control thread notification 122 as a parameter. The control thread 111 makes the DVD read part 143 perform execution referring to the parameter. Transition of the control entity from the DVD read part 143 to the control part 150 is fixed by a processing sequence of the control thread 111. For example, when the parameter is not set, the control part 150 is made to perform execution.

The control part 150 checks the preprocessing output buffer flag like the processing at T1. The preprocessing output buffer flag in a line of the decryption part 144 that is the processing part ID has been set to "Existence," and therefore the decryption part 144 and the DVD read part 143 can perform executions. After checking the preprocessing part ID, since the processing of the decryption part 144 is using the data of the DVD read part 143, the control part 150 gives a higher priority to the decryption part 144 and performs the processing thereof. The decryption part 144 instructs encryption to the encryption circuit control thread control queue 123 like the DVD read part 143, and stores the data received from the DVD control thread output buffer queue 121 in the encryption circuit control thread input buffer queue 124. The DVD read part 143 does the same operation as in the period of times T1 to T2.

From T4, the DVD/CD 107 and the encryption circuit 108 operate in parallel, and at T5 processing of the DVD/CD 107 and the encryption circuit 108 is completed (see 305 and 302 of FIG. 3). Moreover, at T5, processing of the DVD control thread 112 and the encryption circuit control thread 113 is resumed. When the processing of the DVD control thread 112 and the encryption circuit control thread 113 is resumed, the preprocessing part output buffer flags in lines of the decryption part 144 and the decompression part 145 of the processing part ID of the application management table 118 turn to be "Existence," read data is stored in the DVD control thread output buffer queue 121, a read completion notification 122 is outputted to the DVD control thread output buffer queue 121, decrypted data is stored in the encryption circuit control thread output buffer queue 125, and a decryption completion notification is outputted to the encryption circuit control thread notification 126.

Although an example that start times and completion times of the devices operating in parallel coincide is shown for simplicity, it is not necessary for them to coincide. Receiving these notifications, the control part 150 checks the application management table 118, and performs the DVD read part 143, the decryption part 144, and the decompression part 145. From a dependence relationship of the processing parts shown by the application management table 118, the decompression part 145 will be of a highest priority and the DVD read part 143 will be of a lowest priority.

By this, the DVD control thread 112, the encryption circuit control thread 113, and the decompression thread 114 are executed, the DVD/CD 107, the encryption circuit 108, and the CPU 101 start to operate in parallel from T6, and at T7 processing of these devices is completed (see 309, 306, and 303 of FIG. 3). When processing of these devices is completed at T7, the preprocessing part output buffer flags in lines of the decryption part 144, the decompression part 145, and the HDD write part 146 that are the processing IDs of the map updating application 201 of the application management table 118 turn to be "Existence." Since the control part 150 performs control referring to this flag, from T8, the DVD/CD 107, the encryption circuit 108, the CPU 101, and the HDD/nonvolatile memory 109 operate in parallel, and at T9, processing of these devices is completed (see 313, 310, 307, and 304 of FIG. 3). The data processed by the HDD/nonvolatile memory 109 in period 304 from T8 is data that is read from the DVD/CD 107 in period 301, is decrypted by the encryption circuit 108 in period 302, and is decompressed in period 303.

Regarding the priorities of the threads, for parallel operations of the CPU 101 and the peripheral devices 103 to 110, the priorities of the device control threads 112, 113, 115, and 117 are set higher than those of the CPU processing threads 114 and 116. Moreover, in order to fix operation timings of these threads correctly, the priority of the control thread 111 is set higher than those of the CPU processing threads 114 and 116 and the device control threads 112, 113, 115, and 117.

Transfer of a control entity in order to realize the control by the above-mentioned priorities when the operation start times and the completion times of the devices that operate in parallel do not coincide will be explained. When the operation start times and the completion times of the devices do not coincide, a trigger of execution start for a thread other than that being executed occurs when any one of the device control threads 112, 113, 115, and 117 and the CPU processing threads 114 and 116 is being executed. This trigger is an interrupt from the peripheral devices, such as the DVD/CD 107, and an interrupt from the device control threads 112, 113, 115, and 117. The interrupt from the peripheral device is a trigger to any one of the corresponding device control threads 112, 113, 115, and 117. Its execution sequence is controlled according to the priorities of the device control thread to be started for execution by this trigger and of the thread being executed both of which are defined in the application management table 118 (a thread on the downstream side that performs sequential processing of the same data is high in priority). Since the interrupts from the device control threads 112, 113, 115, and 117 are completion notifications from the device control threads 112, 113, 115, and 117, respectively, as described above, the control is done so that the control thread 111 may be executed because the priority of the control thread 111 is higher than those of other threads.

With the above configuration and control, it becomes possible to perform the control at a timing at which the peripheral devices can operate in parallel, so that a fast response speed and a high throughput can be realized.

In addition, by such a contrivance, it is also possible to realize an application that processes data, as in the route guidance application 202, in an order of the HDD read part 147, the map display data origination part 148, and a display part 149 with the same device. The route guidance application 202 can be defined as shown in the application management table 118. By doing the same control according to a definition of the route guidance application 202, it is possible to make the HDD/nonvolatile memory 109, the CPU 101, and the display 110 operate in parallel. Although in the map updating application 201 the HDD/nonvolatile memory 109 is made to operate with a higher priority, in the route guidance application 202 the HDD/nonvolatile memory 109 is made to operate with a lower priority. Thus, by a definition of the application management table 118, the use sequence (operation sequence) of the peripheral devices can be flexibly changed.

Up to here, although the operations of the map updating application 201 and the route guidance application 202 have been explained, an operation of a map retrieval application is also the same. The map retrieval application reads data from the HDD/nonvolatile memory 109, converts data that coincides with the condition selected from the data read by the CPU 101 into data for display, and displays it on the display 110. At this time, the HDD/nonvolatile memory 109, the CPU 101, and the display 110 are made to operate in parallel. Similarly, it is possible to realize a route guidance application, a TV recording application, a music reproduction application, an image reproduction application, a CD ripping application, etc. and to freely switch them.

Second Embodiment

It is also possible to make the map updating application 201 and the route guidance application 202 operate in parallel. In this case, the control part 150 records an application ID controlled last by the instruction ID 151. When the control is returned to the control part 150, by lowering the priority of the application ID recorded in the instruction ID 151, it is possible to prevent a situation where one of the map updating application 201 and the route guidance application 202 exclusively uses the HDD/nonvolatile memory 109 and the CPU 101 that are shared by the both applications, which interrupts the operation of the other application. Regarding processing that has no dependence relationship in data like processing performed in the HDD write part 146 and the HDD read part 147 that share the HDD/nonvolatile memory 109, no priority is given to them, so that when operation timings overlap, the two parts will be made to operate alternately. Although there is an inversion of priority in processing that uses the HDD/nonvolatile memory 109 between the map updating application 201 and the route guidance application 202, it does not keep other processing waiting because it is a processing with no dependence relationship in data. In this way, it becomes possible to execute in parallel application programs each with a different use sequence of the peripheral devices.

Third Embodiment

An HDD is a device that has a large fluctuation in processing throughput. When the device of such a large fluctuation is used and a plurality of applications are used, the fluctuation that affects all the applications being in a parallel operation may cause a problem. For example, consider a case where the route guidance is prioritized over updating of the map updating application 201 and the route guidance application 202. In this case, as shown in FIG. 4, it is possible to maintain a timing of route guidance by adding an application priority in the application management table 118 and managing it. When the control is returned to the control part 150, a device that is associated with the processing part ID of an application ID line of a high priority is made to process data prepared by the preprocessing part. Regarding applications whose priorities are the same, they are parallelized efficiently by lowering the priority of the application controlled last that is recorded by the instruction ID 151, like the second embodiment. By setting up the process in this way, it is possible to make coexist the route guidance application 202 that is intended to assure the throughput and the map updating application 201 that is good only if the processing is performed with as high a throughput as possible.

According to this embodiment, the data processor manages a processing sequence of the peripheral devices that are used from the input to the output both of which are used in the application program with software. In addition, regarding processing whose data has a dependent relationship, processing in which data waiting for the processing exists and that is near the termination of the output device, etc. is performed with a higher priority. For this reason, each peripheral device becomes capable of being controlled smoothly at a timing of being able to operate in parallel, so that it becomes possible to change the use sequence of the peripheral devices flexibly while realizing the fast response speed and the high throughput.

Further, regarding processing such that data has no dependent relation, a priority is not given to it. Accordingly, even if there is inversion of the priority, other processing is not kept waiting as long as the processing does not include data having any dependent relation. Thereby, it becomes possible to execute in parallel the application programs each with a different use sequence of the peripheral devices. For example, it becomes possible to execute in parallel a route guidance application program that must keep a route guidance timing and a recording application program of a TV broadcast that is not allowed to partially fail to record data.

With the same contrivance, it is also possible to make each processing group have a priority. In this case, it is possible to make coexist processing that assures a throughput and processing that is enough only if the processing is performed with as high a throughput as possible. By setting high the priority of processing whose throughput is intended to be assured, it is possible to make processing at a low throughput wait. It is possible to make processing of a low priority operate at the greatest executable throughput while realizing assurance of a throughput of important processing. For example, it becomes possible to execute in parallel the route guidance application program that must keep a timing of route guidance and a download application program of a new map, etc. that is intended to be executed in as short a time as possible. In a period when a route guidance processing load is low, a download processing throughput is increased to shorten the download time. In a period when the load is high, the download processing throughput is decreased, so that it is possible to assure the route guidance processing timing.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications within the ambit of the appended claims.

What is claimed is:

1. A data processor comprising:
a CPU;
a plurality of peripheral devices; and
a memory comprising:
a plurality of device control threads for controlling operation of respective peripheral devices;
a control thread including a plurality of processing parts associated with respective device control threads;
a table storing configurations of a plurality of applications including application priority of respective applications, wherein each application includes an operation sequence of processing parts that constitute an application and a dependence relationship between the processing parts of the application, wherein the processing parts are prioritized such that processing part near end of the operation sequence is performed with higher priority than processing part near beginning of the operation sequence;
a program, when executed by the CPU, executes the control thread to perform the method of:
executing two or more of the applications sharing at least one peripheral device in parallel,
wherein when an overlap between operation timings of respective processing parts of the two or more of the applications corresponding to a same peripheral device occurs, processing part with higher priority is executed before respective processing parts of other applications, wherein
if priorities associated with the respective processing parts are the same, application priority of application associated with processing part that last executed is lowered such that processing part of the other application with higher priority is executed, and
if each of the respective processing parts has no dependence relationship based on the configuration stored in the table, no priority is given to the respective processing parts such that the respective processing parts are executed in alternate manner.

2. The data processor according to claim 1, wherein:
the plurality of the applications are defined by the table, and
the control thread for executing peripheral device control instructs to execute a sequences of processing parts defining a target application, according to the application priority provided to each of the applications, and to lower the application priority of the target application versus other applications, when control of the target application is returned to the control thread for executing peripheral device control.

3. The data processor according to claim 2, wherein among the applications the application priorities of which are equal, the application priority of an application corresponding to the processing part instructed last to be executed is lowered.

4. The data processor according to claim 1,
wherein a plurality of threads include the device control threads for controlling peripheral devices and CPU processing threads each corresponding to a predetermined data processing to be executed by the CPU,
in response to an instruction of execution, each of the device control threads controls the corresponding peripheral device according to the instruction,
in response to a completion notification from the corresponding peripheral device, each of the device control threads sends to the control thread a processing result of the corresponding peripheral device and the completion notification, and in response to another instruction of execution, each of the CPU processing threads executes the predetermined data processing according to the another instruction, and sends to the control thread a processing result of the predetermined data processing and a notification.

* * * * *